United States Patent
Lundegren

(10) Patent No.: US 7,461,007 B2
(45) Date of Patent: Dec. 2, 2008

(54) REINSURANCE AUCTION PROCESS

(75) Inventor: Mark E. Lundegren, Evanston, IL (US)

(73) Assignee: Employers Reinsurance Corporation, Overland Park, KS (US)

( * ) Notice: Subject to any disclaimer, the term of this patent is extended or adjusted under 35 U.S.C. 154(b) by 967 days.

(21) Appl. No.: 09/681,413

(22) Filed: Mar. 30, 2001

(65) Prior Publication Data

US 2002/0143584 A1 Oct. 3, 2002

(51) Int. Cl.
*G06Q 40/00* (2006.01)
*H04L 9/00* (2006.01)

(52) U.S. Cl. .................. 705/4; 705/37; 705/80
(58) Field of Classification Search ............. 705/4
See application file for complete search history.

(56) References Cited

U.S. PATENT DOCUMENTS

| | | | |
|---|---|---|---|
| 4,831,526 A | 5/1989 | Luchs et al. | |
| 5,704,045 A | 12/1997 | King et al. | |
| 5,809,478 A | 9/1998 | Greco et al. | |
| 5,873,066 A | 2/1999 | Underwood et al. | |
| 6,119,093 A * | 9/2000 | Walker et al. ............ | 705/4 |
| 6,134,536 A | 10/2000 | Shepherd | |
| 7,080,020 B1 * | 7/2006 | Klaus ..................... | 705/4 |
| 7,240,016 B1 * | 7/2007 | Sturgis et al. ............ | 705/4 |
| 2002/0046067 A1 * | 4/2002 | Kraehenbuehl et al. ... | 705/4 |
| 2003/0200125 A1 * | 10/2003 | Erlanger ................ | 705/4 |

OTHER PUBLICATIONS

MacSweeney, Greg, "Reinsurance goes virtual at General Life," Dec. 1999. Insurance & Technology. vol. 24, Iss. 13; p. 19, 1 pg.*

* cited by examiner

*Primary Examiner*—C Luke Gilligan
*Assistant Examiner*—Rachel L Porter
(74) *Attorney, Agent, or Firm*—Armstrong Teasdale LLP

(57) ABSTRACT

An insurance auction process comprises preliminary steps of establishing a network of participating insurers and establishing an insurance capacity for each participating insurer. Upon receipt of a request for insurance from a cedent, an underwriting analysis of the request for insurance is performed by the sponsor of the auction and underwriting report is produced. The request for insurance and the underwriting report are posted enabling participating insurers to submit bids to cover a portion of the insurance. Each bid includes a maximum percentage of insurance offered and a rate. After receiving the bids, the sponsor selects those bids which fulfill the request for insurance at an optimized rate and offers those bids, as an insurance proposal, to the cedent. The sponsor may guarantee payment of claims by the insurers, and if it does it assesses a credit risk charge to the rate charged to the cedent.

36 Claims, 7 Drawing Sheets

FIG. 3

Request for Reinsurance Available for Bidding — 75

Property

| | Questions Accepted | Bids Accepted |
|---|---|---|
| Primary Insurance Co. — 77 | 06/01/01–06/05/01 — 80 | 06/15/01–06/30/01 — 81 |
| Friendly Insurance Co. — 77 | 07/01/01–07/05/01 | 07/15/01–07/30/01 |

Casualty

| | | |
|---|---|---|
| Helpful Insurance Co. — 77 | 06/16/01–06/20/01 | 07/01/01–07/15/01 |
| Thrifty Insurance Co. — 77 | 07/16/01–07/20/01 | 08/01/01–08/15/01 |

83 — Select link to submit questions or to bid on a specific request

REINSURANCE AUCTION PROCESS

BACKGROUND OF INVENTION

The present invention relates to a method for coordinating the sale of insurance through an auction.

The purpose of insurance is to redistribute risks. Insurers or risk carriers assume portions of the risks of their clients or insureds in exchange for premiums. Insureds may also be referred to as cedents in that they cede risks to a risk carrier or insurer. Reinsurance is used by insurance companies to redistribute their exposure to other insurers. In a reinsurance agreement, an insurer, often referred to as a primary insurer or ceding company, transfers or cedes some or all of its exposures and premiums to a reinsurer. The reinsurer then agrees to indemnify the ceding company for a predetermined type and amount of losses sustained. In general terms, any party that transfers risk, through either a primary insurance policy or a reinsurance contract may be referred to as a cedent or a ceding party.

It is important to understand that insurers, including primary insurers and reinsurers, are regulated as to the amount of insurance they can write, or risk that they can assume, based on the amount of surplus funds they hold. The capacity of an insurer generally refers to the monetary amount of insurance or risk of loss which the insurer can agree to cover based upon their surplus funds. An insurance company can increase its capacity to allow it to write more policies or to write policies with higher coverage limits by reinsuring a portion of the risks it is carrying.

There are two broad types of reinsurance contracts: treaty and facultative. Treaty reinsurance involves an agreement in which the primary insurer agrees in advance to cede certain classes of business or types of insurance to the reinsurer. Under a treaty reinsurance contract, the reinsurer agrees to reinsure some portion of the risk of all of the primary insure's insurance contracts related to a particular line of business or type of insurance. Individual risks are not underwritten or discussed. The reinsurer relies on the primary insurer to accept only risks that fall within acceptable underwriting criteria and reinsures all risks that fall within the reinsurance treaty agreement. On the other hand, facultative reinsurance involves separate reinsurance agreements for each risk or policy that is being reinsured.

In addition to the broad types of reinsurance contracts, there are various ways in which the parties may share or cede the risks. Two primary classifications of risk sharing arrangements are referred to as proportional arrangements or excess of loss arrangements. In a proportional agreement, a certain percentage of every risk covered by the agreement is ceded by the primary insurer to the reinsurer. However, in an excess of loss reinsurance agreement, only losses beyond a certain level are ceded to the reinsure.

Historically, reinsurance contracts have been initiated by the primary insurer, or by a broker on behalf of the primary insurer, which approaches one or more reinsurers and requests coverage of a certain amount of its portfolio. An underwriter for the reinsurer evaluates performance data for the primary insurer and evaluates the risk associated with the requested reinsurance amount and decides how much coverage or capacity the reinsurer is willing and able to offer and under what financial and legal terms. This offer is either accepted or declined by the cedent or primary insurer. This process is typically effected by telephone, facsimile, letter, or personal contact and may involve ongoing negotiations as to the financial and legal terms or the amount of capacity offered. These are also essentially the same methods used for selling most types of insurance.

If the primary insurer or cedent wants to involve multiple reinsurer's in the process, the cedent or its broker must correspond with representatives of each of the reinsurers and each of the reinsurers must perform its own analysis and underwriting to determine under what terms, if any, it is willing to assume a portion of the risk associated with the insurance contract.

The efforts required by the cedent or its broker to coordinate the obtaining of offers for reinsurance and the need for each reinsurer to perform its own analysis and underwriting of the risk to be reinsured, results in unnecessary duplication of efforts and is inefficient. There remains a need for more efficient methods for marketing and selling reinsurance contracts.

SUMMARY OF INVENTION

The invention described herein comprises a method for coordinating, by a sponsor, the auctioning insurance or reinsurance. The process is described hereafter with reference to reinsurance. As a preliminary step of the process the auction sponsor establishes a network of participating reinsurers meeting eligibility requirements to participate in the auction. The sponsor also establishes an insurance capacity for each of the participating reinsurers. The sponsor then solicits and receives requests for reinsurance from cedents. Upon receipt of a request for reinsurance, the sponsor performs an underwriting analysis of the request for reinsurance and produces an underwriting report or prospectus which includes an analysis of the risk of loss associated with the reinsurance. The risk of loss is often expressed as a loss cost factor.

Upon completion of the underwriting report, the sponsor posts or makes available to the participating reinsurers the request for reinsurance and the underwriting report. The sponsor then establishes a period in which it will accept bids from the participating reinsurers to provide the requested reinsurance. During the selected period, the sponsor accepts bids from participating reinsurers to cover a portion of the reinsurance. Each of the bids includes a maximum percentage of reinsurance offered by the participating reinsurer and a rate.

The sponsor selects bids which will fulfill the request for reinsurance and prepares a reinsurance proposal incorporating the selected bids. The sponsor then offers the reinsurance proposal to the cedent for acceptance. If the reinsurance proposal is accepted, the sponsor binds the selected reinsurers and then administers the reinsurance program.

The auction process or rules may permit the auction sponsor to participate in providing the reinsurance requested to encourage confidence in the auction. In such a case the sponsor preferably picks a share and rate for the reinsurance prior to reviewing bids from the participating reinsurers, and the sponsors bid is preferably automatically accepted. The step of selecting bids for the reinsurance proposal includes optimizing the bids selected to minimize the cost of the reinsurance proposal to the cedent, except to the extent that inclusion of the sponsors bid does not result in the minimal cost of reinsurance.

As part of the process, the sponsor may agree to guarantee payment by each of the selected participating reinsurers on any proper claims made on the reinsurance. If the sponsor guarantees claims payments, the sponsor adjusts the bid rate of each bid to include a credit risk charge which it collects from the cedent to insure against the risk of defaults by participating insurers on payment of claims. In addition to the credit risk charge, the sponsor also adjusts the bid rate of each bid to include a service charge to be paid by the cedent and collected by the sponsor.

In another aspect of the process, after the sponsor selects the bids to include in the proposal, the sponsor provides the cedent an opportunity to adjust participation level of the bidding reinsurers, whether or not the reinsurer was included in the sponsor's proposal. Any such adjustments must be within the reinsurers capacity or maximum specified share.

Objects and advantages of this invention will become apparent from the following description taken in relation to the accompanying drawings wherein are set forth, by way of illustration and example, certain embodiments of this invention.

The drawings constitute a part of this specification, include exemplary embodiments of the present invention, and illustrate various objects and features thereof.

BRIEF DESCRIPTION OF DRAWINGS

FIG. 3 is a diagrammatic view of a bid listing web page providing a listing of requests for reinsurance submitted using the request submission web page of FIG. 2.

DETAILED DESCRIPTION

As required, detailed embodiments of the present invention are disclosed herein; however, it is to be understood that the disclosed embodiments are merely exemplary of the invention, which may be embodied in various forms. Therefore, specific procedural and functional details disclosed herein are not to be interpreted as limiting, but merely as a basis for the claims and as a representative basis for teaching one skilled in the art to variously employ the present invention in virtually any appropriately detailed process or application.

Equipment and Participants

Figure 1:
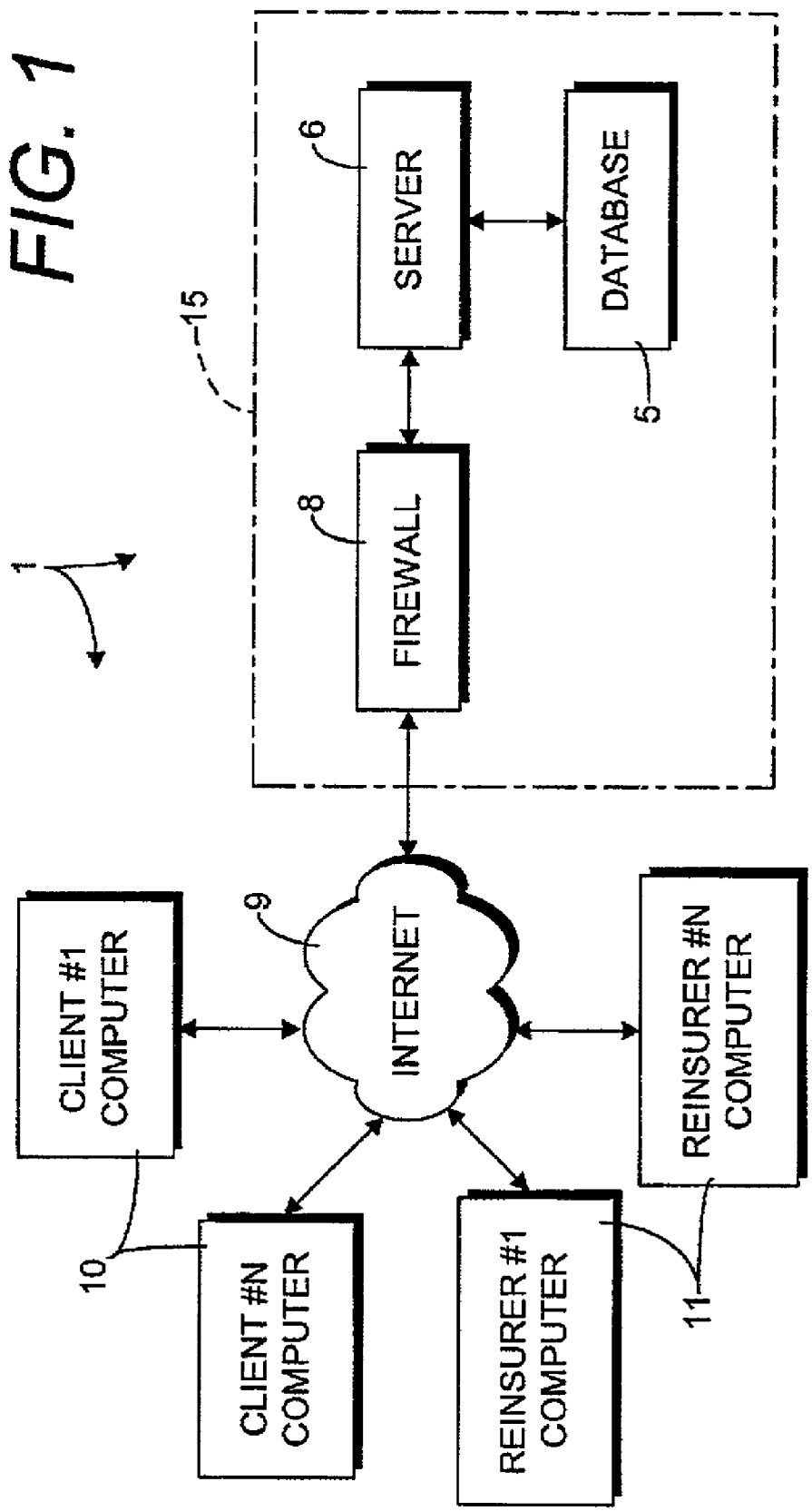
FIG. 1 is a simplified block diagram illustrating an online interconnection of clients and reinsurers with a reinsurance auction sponsor for practice of the reinsurance auction method.

Referring to the drawings in more detail, FIG. 1 is illustrative of an interactive system or computer network 1 for use in carrying out the methodology of the present invention for coordinating the sale of reinsurance from a primary insurer to a network of reinsurers through an auction. The computer network 1 is established, operated and maintained by an auction sponsor, which may also be a reinsurer. Although the computer network 1 as described utilizes a global computer network, such as the internet, it is to be understood that the methodology of the present invention could be practiced utilizing other computer or communications networks.

The computer network 1 is preferably conventional for internet applications and includes a database 5, a server 6 and a firewall 8 which are selectively accessible through the internet 9 from computers 10 and 11 of end users. As used herein the database 5, the server 6, firewall 8 and software run thereon to store, provide access to and manipulate data stored in the database 5 or on the server 6 and firewall 8, may collectively be referred to as a server or system server 15. The system server 15 is generally assembled, operated, maintained and connected to the internet 9 by or under the authority of the auction sponsor. The end users use web browsers on their computers 10 or 11 to connect to the system server 15. The system server 15 responds to requests and commands received from the end user's browser, to generate pages of an interactive auction network website through which part of the methodology of the present invention may be practiced.

There are two main types of end users: primary insurers and reinsurers. The end users may also include the brokers, representatives or agents of the primary insurers or representatives or agents of the reinsurers. The primary insurers may also be referred to as cedents, clients or customers. Similarly, the reinsurers may be referred to as retrocessionaires or markets. Primary insurers use the interactive system 1 to submit or post a request for reinsurance of an insurance portfolio or program through the online auction to receive bids for providing the requested reinsurance from participating reinsurers.

As used herein, an insurance program or portfolio generally refers to all of the insurance policies issued by an insurer which fall within a specific class or line of business of the primary insurer or which fall within criteria established for a reinsurance treaty. The process for coordinating the sale of reinsurance is described in the detailed description with reference to treaty type reinsurance or facultative automatic type reinsurance. However, it is foreseen that the process could also be used for coordinating the sale of facultative reinsurance for individual insurance contracts. As used in the claims the term insurance program should also be interpreted to cover a single or individual insurance contract for which reinsurance is sought as well as treaty and facultative automatic type programs. It is also foreseen that the process described and claimed could be used for coordinating the sale of primary insurance contracts.

Preliminary Steps in Establishing Network

Implementation of the interactive system and method requires some preliminary steps which do not necessarily occur sequentially, may occur simultaneously or may occur intermittently over an extended period of time. In one of the preliminary steps, the auction sponsor establishes eligibility criteria which reinsurers must meet to participate in the auction network. Such eligibility criteria focus primarily on the credit worthiness of the reinsurer. The criteria used considers standard financial rating guidelines, such as S&P, Moody's or AM Best ratings as well as other financial measures of the reinsurers liquidity and leverage. Related to a determination of the eligibility criteria, the sponsor determines what types or lines of insurance it intends to offer reinsurance coverage for through the auction network.

The sponsor also establishes capacity management and credit risk controls, to minimize the risk of default by any of the reinsurers selected to participate in the auction network. The capacity management tools include both general capacity limitations for all participating reinsurers and specific capacity limitations for each of the reinsurers. The general capacity management controls developed by the sponsor establish a maximum per deal participation level by any one reinsurer in any of the programs offered for auction through the network.

Such a control is intended to ensure that the risk is spread among multiple reinsurers. For example, the sponsor may establish a maximum capacity of any one reinsurer for any auctioned program to be 50 percent of the total program. Similarly, the sponsor establishes a maximum aggregate capacity of any one reinsurer participating in the auction network. The aggregate capacity establishes the maximum amount of reinsurance coverage or exposure any one reinsurer will be able to bind itself to both through the auction network and elsewhere. For example, the maximum aggregate capacity for any of the participating reinsurers may be set at 100 million dollars based upon ceded premiums.

Additional capacity management controls provide the criteria for determining the per deal and aggregate capacity of each reinsurer selected to participate in the auction. The criteria used to determine or calculate the per deal and aggregate capacities for each reinsurer will take into consideration its cash reserves, credit rating and other liquidity and leverage financial data. The resulting capacity established by such criteria is typically less than the capacity established by industry regulations and is less than the general capacities set by the auction sponsor. As an example of per deal and aggregate capacities, a specific reinsurer may be limited to no more than twenty five percent share of the loss exposure of any one deal with an aggregate loss exposure of no more than 250 million dollars in ceded premiums.

In addition to establishing the eligibility and capacity criteria for participating reinsurers, the sponsor also develops contracts and rules governing the operation of the network, the auction process, servicing and maintenance of the completed reinsurance program or deal, and the rights and obligations of the sponsor, the reinsurers and the primary insurers involved in the auction process.

Having established the eligibility criteria and capacity criteria for reinsurers and the agreements and rules which will govern the auction network and process, the sponsor then solicits and enlists reinsurers to participate in the reinsurance auction network. In the solicitation process, the sponsor will obtain the necessary information and documents from potential participating reinsurers to evaluate their eligibility and determine their capacity. The sponsor will also determine what lines of insurance each reinsurer is interested in reinsuring. The sponsor then evaluates the information and documents provided by the reinsurers to determine their eligibility to participate in the reinsurance network and the scope and terms of this participation, such as capacity or lines upon which the reinsurer can bid.

The sponsor then enters into contractual agreements with eligible reinsurers meeting the eligibility criteria and interested in participating in the auction network. Reinsurers selected to participate in the reinsurance network may be referred to as network reinsurers or participating reinsurers. The network reinsurers are provided with a unique user identification, or user ID, and/or password to allow secure access to the web pages generated by the system server. The user ID and password are associated with data entered into the system by the network reinsurer as discussed in more detail hereafter.

In addition to soliciting and enlisting network reinsurers, the sponsor also solicits and enlists primary insurers or cedents interested in seeking proposals for reinsurance through the auction network. The sponsor solicits primary insurers offering coverage in the lines for which the sponsor has enrolled reinsurers interested in offering their reinsurance services. The sponsor then enters into contractual agreements with selected primary insurers interested in utilizing the auction network. The selected primary reinsurers may also be referred to as customers or clients. The sponsor sets up separate data records, accounts or files for each primary insurer in the system server 15. Upon enrollment of a primary insurer, the sponsor provides the client with a unique user identification designation (User ID) and or a password to provide the client secure access to selected information in the system server 15.

Although the preliminary steps described generally have to occur to some degree before the auction network can become operational, it is to be understood, that the network sponsor will periodically or continually solicit additional reinsurers and primary insurers to participate in the auction network. In addition, the rules and contractual agreements as well as the lines and types of coverage provided will evolve and change over time.

The Auction Process

To initiate the auction process, the sponsor solicits clients to submit through the auction network, a request for bids to provide reinsurance on one or more of its insurance portfolios or programs. The submissions may be made by the client itself or through a representative of the client or a broker. A submission is made through the auction network interactive website, accessed through the system server 15. The client accesses its account and data files by logging into the website using its user ID and password.

Figure 2:
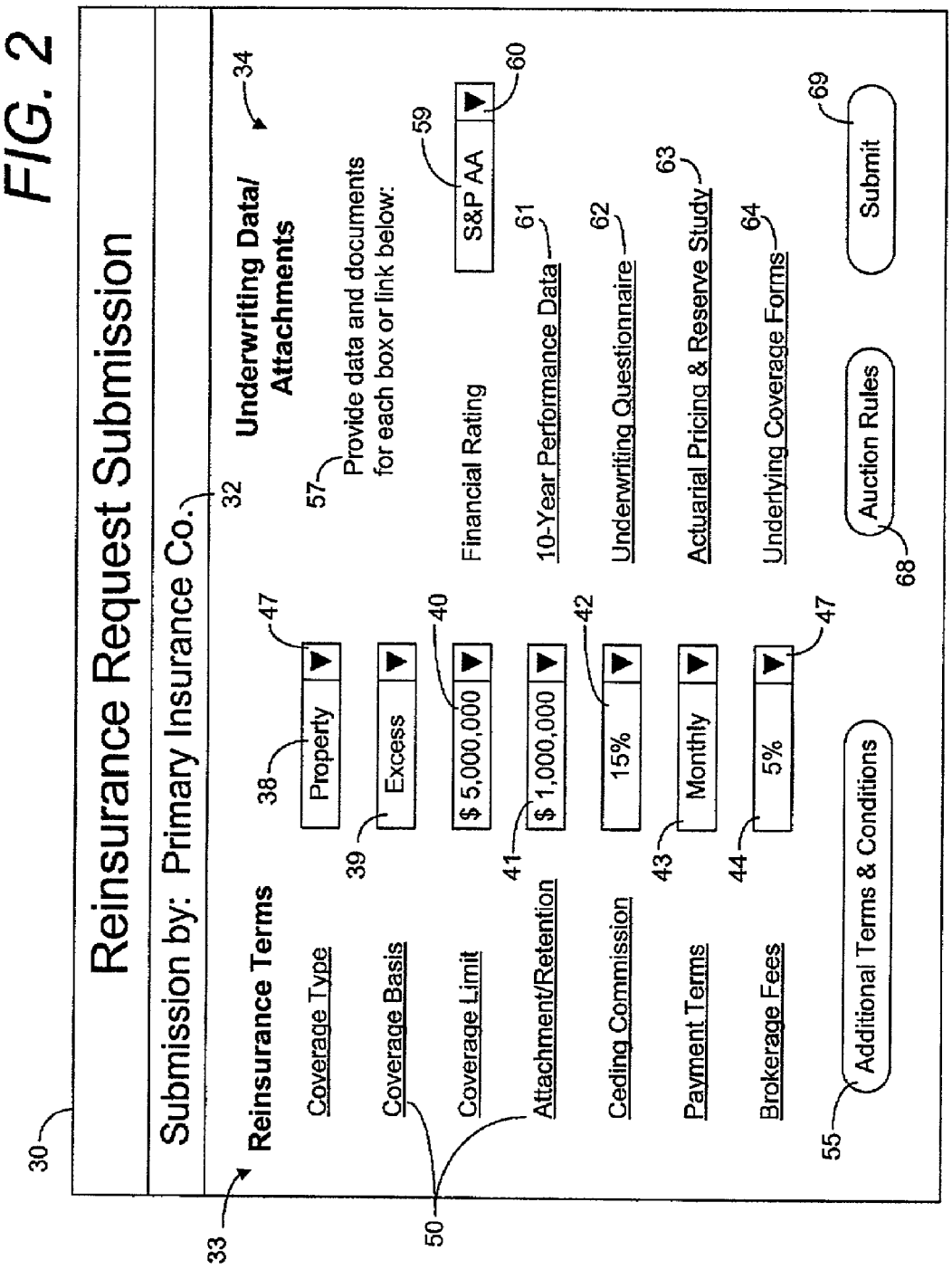
FIG. 2 is a diagrammatic view of a request submission web page for submitting a request for bids on providing reinsurance.

The client provides the necessary information for submitting a request for bids though a submission screen 30 shown diagrammatically in FIG. 2. Upon accessing the submission screen 30 through the website, the client's name is associated with the page 30 through the system server 15 and entered in a client identification space 32. The names of companies shown in the drawings are intended to be for illustrative purposes. No reference to any actual company is intended. The submission screen, as shown in FIG. 2, includes two primary sections, a first section 33 for the client to select the basic parameters of the request for reinsurance, and a second section 34 for the client to provide answers to questions and attach documents to be used to underwrite the program for which reinsurance is sought.

The parameters for which information is sought in the first section 33 focus primarily on financial terms of the reinsurance and additional contractual provisions. Boxes or spaces are provided in the first section 33 for use by the client to provide information concerning; coverage type, box 38; coverage basis, box 39; coverage limit, box 40; attachment/retention, box 41; ceding commission, box 42; payment terms, box 43; and brokerage fees, 44. The boxes 38-44, as shown, are of a drop down type, with drop down buttons 47. Selecting the drop down button 47 of a box 38-44 provides a listing of common selections, which when selected automatically fill in the associated box 38-44.

The descriptive reference 50 for each box 38-44, may function as a hyper-text link. Upon selecting the link, the client is provided a definition or description of available selections for the associated box. Referring specifically to the boxes discussed, the coverage type box 38, is used to select or indicate the type of coverage for which reinsurance is sought. Representative options might include, property, casualty or worker's compensation lines of insurance. The coverage basis box 39, as used herein, is intended to be used to select between excess or proportional type reinsurance.

The coverage limit box 40 is used by the client to specify the maximum amount of coverage on which it is willing to bid. If the coverage type is "excess", the amount is expressed as dollars (or other form of currency), and if the coverage type is "proportional", the limit is expressed as a percentage. The attachment/retention box 41 is used by the client to generally indicate the minimum level of coverage at which the reinsurance is to apply. For excess type coverage, this amount is generally expressed in dollars or currency, while for proportional type coverage, the limit is expressed as a percentage.

The ceding commission box 42 allows the client to specify the amount of commission it is interested in receiving usually expressed as a percentage of the premiums received. The payment terms box 43 is intended to allow the client to specify how often it wants to make payments. Usually such terms are monthly or quarterly. The brokerage fee box 44 is intended to be used by the client to specify any amount which needs to be paid to a broker who facilitated the deal, generally as a percentage of the premiums collected.

In addition to the boxes 38-44, one or more links, represented by a link or button 55, are provided to allow the client some leeway in customizing the terms of the reinsurance agreement to be submitted for auction. Selecting link 55 advances the client to one or more additional screens (not shown) through which the client can customize at least some of the remaining terms and conditions of the reinsurance proposal to be submitted for bids. Such terms might include an additional profit commission, termination or cancellation provisions, reinstatement provisions, cash loss trigger provision and claims notification trigger provision. It is also foreseen that the submission screen 30 could be modified to incorporate boxes or the like to allow selection or modification of these provisions. Completion of the first section 33 of the screen allows the client and the sponsor to establish the terms and conditions to of the reinsurance contract or program prior to soliciting reinsurers to make offers for providing the reinsurance sought. In existing practices for establishing a reinsurance syndicate or the like, the terms and conditions of the reinsurance contract or program are not finalized until after participating reinsurers have been selected and sometimes not even until after they have been bound.

As noted above, the second section 34 is adapted to allow for collection of underwriting information regarding the proposal and the primary insured seeking reinsurance. Instructions 57 are provided instructing the client to provide the requested information or documents through the links or boxes provided. A financial rating selection box 59 is provided and includes a drop down selection button 60, which provides selections of possible financial rating information from rating entities including ratings for S&P, AM Best and Moody's.

Links 61, 62, 63 and 64 are representative of links which may be included to obtain additional underwriting information or documents. Link 61 connects the user to a page or pages (not shown) for collecting 10-Year performance data of the client. Such data includes; 10-year loss data, 10-year rate change data, 10-year premium data, 10-year limits profile, and 10-year attachment point profile. Link 62 connects the user to a page or pages (not shown) for collecting additional underwriting information and questionnaires including: special loss modeling data, expense component summary, increased limit factors, increased limit methodology questionnaire, loss cost data, reserving questionnaire, catastrophe control questionnaire, other by line questionnaire, company management questionnaire and a bordereau elements verification. Link 63 connects the user to a page or screen to allow the client to connect or associate its current Actuarial Pricing and Reserving Study with the other underwriting data and the submission. Similarly, link 64 connects the user to a page or screen to allow the client to connect copies of its coverage forms to the submission for review by the underwriter.

An Auction Rules button 68 is provided on the submission screen to allow the client to review the governing rules of any auction under which its proposal or submission may be offered. A submit button 69 is also provided to allow the client or user to submit a bid for auction through the auction network once it has provided the requested information. The system server 15 is generally programmed to confirm that the client or user has provided all of the required information upon selection of the submission button 69 and to prompt the client to provide any missing information upon selection of the button 69.

Upon submission of a request for reinsurance, the sponsor conducts a standard underwriting analysis of the submission. In addition to the information and documents provided by the client, the underwriter may also rely on industry trend data and the like. The underwriting information is used to determine a risk of loss on the insurance or a loss cost estimate and other analytical metrics associated with the insurance program for which reinsurance is sought. The loss cost estimate generally comprises an indication of the dollar amount of losses expected on an insurance program over a set period expressed in terms of present value.

Once the underwriting is complete, the sponsor finalizes the reinsurance contract wording with the client or broker and prepares a prospectus concerning the request for reinsurance. The prospectus is intended for presentation to eligible reinsurers for their use in formulating bids. Although the client previously selected contract terms and conditions through the submission screen 30, the sponsor may want to work with the client or broker to revise or modify terms, based upon the results of the underwriting, or to facilitate the auction.

The sponsor may also decide in advance of the auction that it will participate in the reinsurance to instill confidence in the insurance program by the other participating reinsurers. Since the sponsor is privy to bids by other participating reinsurers, it typically will not participate in the auction process itself as a bidding reinsurer, rather the sponsor generally will indicate in advance, to the participating reinsurers, that it will take a certain percentage of the reinsurance, without specifying the rate. It is anticipated that specifying a rate by the sponsor to the participating reinsurers, would unduly influence the bids of the bidding reinsurers. However, the sponsor would inform the client or broker of its proposed percent participation and rate prior to posting the program for bids to obtain the clients approval.

Nevertheless it is foreseen that the sponsor could also participate as a bidding reinsurer. If it chose to do so, steps preferably would be taken to prevent the representative of the reinsurer bidding on the program from accessing the bids submitted by the other bidding reinsurers.

Once the contract terms and prospectus have been finalized, the sponsor establishes dates for the bidding process. The bidding process will include a question period, in which potential bidders may submit questions to the sponsor regarding the request for reinsurance, the underwriting, terms and condition or other relevant questions. The sponsor will also preferably establish a response period in which to respond to any questions posed although it is foreseen that the period for responding to questions could be left open until all of the questions are answered. The sponsor will also establish a period in which it will accept bids including a starting date and an ending date. If the response period is left open, the sponsor may establish a length for the bid period without determining the actual dates until the responses are completely answered.

The information, including documents associated with the request for reinsurance, including the underwriting data and analysis, the contract terms and the periods for questions and bidding are stored in the database 5 for access through the system server 15 and web pages associated therewith.

Referring to the drawings, FIG. 3 represents a bid listing screen 75 accessible by a participating reinsurer. Each participating reinsurer may access a reinsurer specific bid listing screen 75 through the website. The bid listing screen 75 provides a listing, shown in the form of hypertext links 77, of requests for reinsurance upon which the participating reinsurer is eligible to bid. As shown in FIG. 3, the entries in the listing may be displayed in groupings by type of coverage. The links 77 shown include the name of the client submitting the request for reinsurance. It is understood that additional or alternative identifying information concerning the request for reinsurance could be used to identify each request on bid listing screen 75. Also provided on screen 75, are the dates 80 for the period in which questions regarding each reinsurance request will be accepted, and the dates 81 for the bidding period for each reinsurance request. Instructions 83 are also provided instructing the client or user to select or click on a link 77 to submit questions or submit a bid on a specific request.

Figure 4:
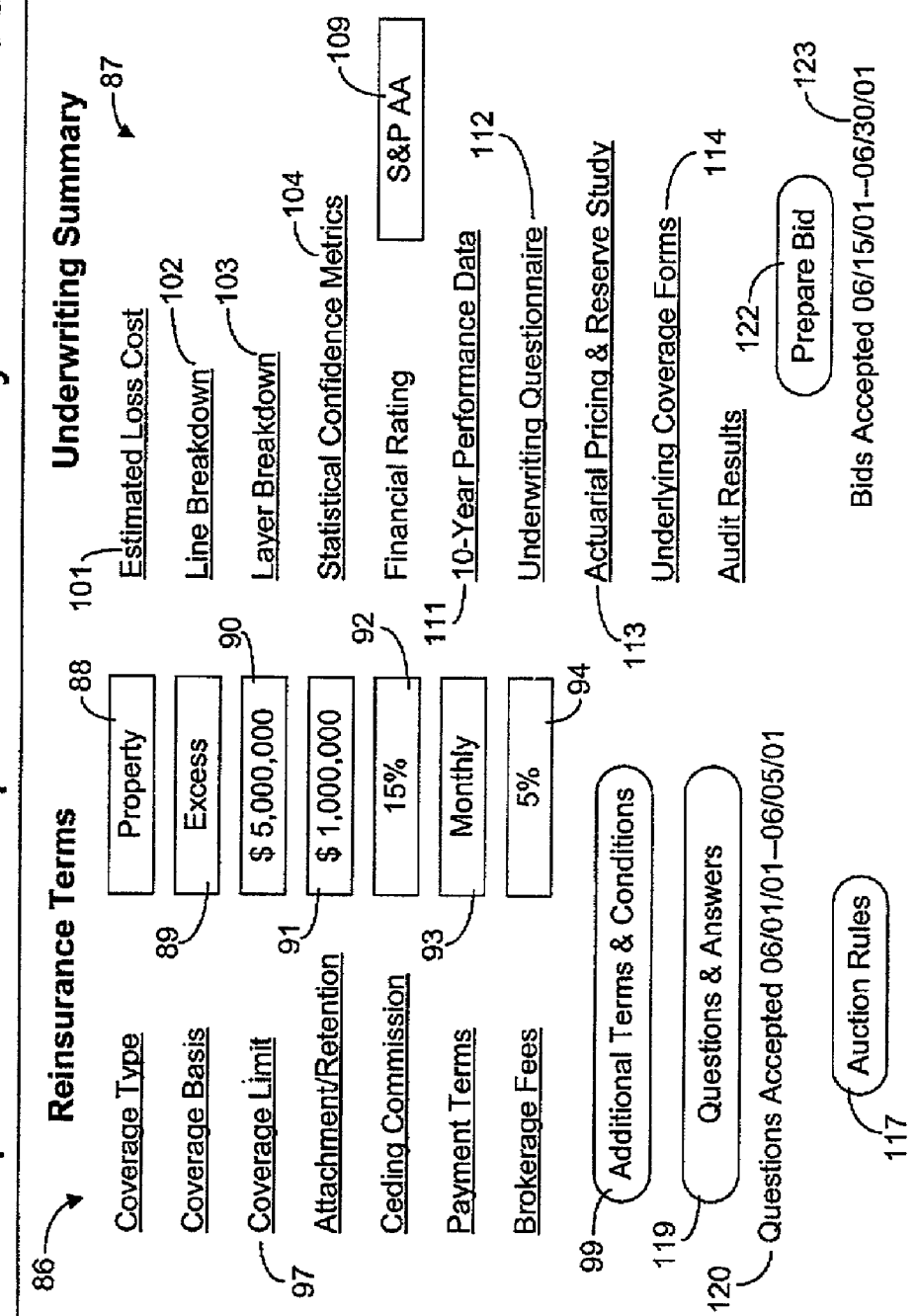
FIG. 4 is a diagrammatic view of a prospectus web page providing contract terms and underwriting information regarding a request for reinsurance.

Selecting a link 77, generates a prospectus page 83, see FIG. 4, incorporating information to be used by participating reinsurers to determine whether to bid on the request and, if so, for what amount of coverage and at what rate. The prospectus page 83 includes identifying information, or the name 84 for the client seeking bids on the request for reinsurance. Similar to the reinsurance request submission screen 30, the prospectus page 83 generally includes two sections or groups of information; a contract terms section 86, shown under the heading "Reinsurance Terms" and an underwriting section 87 shown under the heading "Underwriting Summary".

The contract terms shown under the Reinsurance Terms heading are similar to the contract terms included on the submission screen 30. Entries are provided for coverage type 88, coverage basis 89, coverage limit 90, attachment/retention 91, ceding commission 92, payment terms 93 and brokerage fees 94. The information or values provided for each of these entries corresponds with the information provided by the client in the similarly titled boxes on the submission screen 30. The description for each entry may also function as a hypertext link 97 to provide explanatory information regarding the nature of the entry. An "Additional Terms and Conditions" button 99 is also provided in the contract terms section 86. Selecting or clicking on this button generates additional pages or windows providing the additional terms and conditions of the reinsurance contract for which bids are being sought. The terms and conditions referenced through button 99 generally correspond with the terms selected by the client through submission screen 30. Such terms might include an additional profit commission, termination or cancellation provisions, reinstatement provisions, cash loss trigger provision and claims notification trigger provision. It is also foreseen that these terms could be individually listed on screen 83.

The underwriting section 87 includes information or links to the underwriting information collected and developed by the sponsor. Links 101, 102, 103 and 104 connect the user to pages or portions of a page providing information on the estimated loss cost (link 101), the line breakdown (link 102), the layer breakdown (link 103) and statistical confidence metrics (104). It is to be understood that the information associated with these links may alternately be displayed on the prospectus page 83.

A financial rating selection box 109 is provided and includes the financial rating information selected for inclusion by the client from box 59 on submission screen 30. Link 111 connects the user to a page or pages for displaying the 10-Year performance data of the client. Such data includes; 10-year loss data, 10-year rate change data, 10-year premium data, 10-year limits profile, and 10-year attachment point profile. Link 112 connects the user to a page or pages displaying the additional underwriting information collected from the client through link 62 on submission screen 30, including: special loss modeling data, expense component summary, increased limit factors, increased limit methodology, loss cost data, reserving information, catastrophe control information, other by line information, company management information and a bordereau elements verification. Link 113 connects the user to a page or screen to view or print the client's current Actuarial Pricing and Reserving Study. Similarly, link 114 connects the user to a page or screen to view or print copies of the client's underlying coverage forms.

An Auction Rules button 117 is provided on the prospectus page 83 to allow the reinsurer to review the governing rules for the auction under which the request for reinsurance of the insurance program will be auctioned. A question and answers button 119 is provided on prospectus page 83 along with an indication of the dates on which questions will be accepted. If the reinsurer has any questions regarding the request for reinsurance, it clicks on button 119 which takes it to a page or pages in which it can enter questions for electronic submission to the sponsor. The page or pages accessed by clicking on button 119 preferably includes a listing of all of the questions answered by any participating reinsurer with respect to the request for reinsurance selected as well as the answers. The sponsor attempts to answer the questions as expeditiously as possible, notifying the asking party by means such as electronic mail and posting an answer in the system server 15 to be included on the question and answer pages generated by clicking on button 119.

The sponsor preferably attempts to answer the questions submitted prior to the expiration of the period in which questions are accepted. If the questions cannot be answered before the expiration of the question period, a good faith effort is made to answer all of the timely submitted questions prior to accepting bids. In addition there is an option of extending the bid period.

Figure 5:
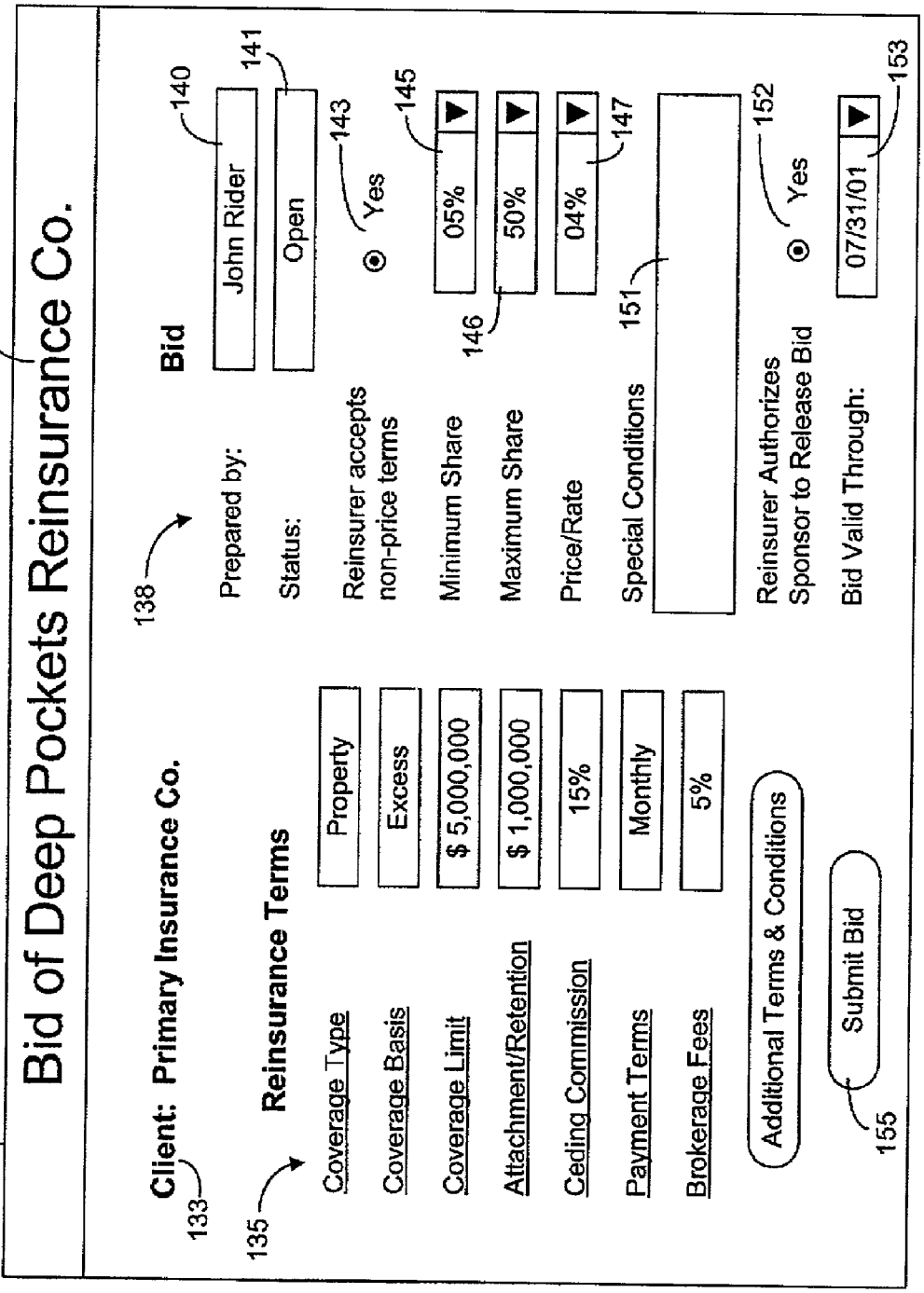
FIG. 5 is a diagrammatic view of a bid preparation web page for use by a reinsurer in submitting a bid in response to the request for reinsurance.

A prepare bid button 122 is provided on page 83 with an indication 123 of the period in which bids will be accepted. Selecting or clicking on prepare bid button 122 generates a bid preparation screen or page 130 (FIG. 5). A reinsurer interested in bidding on providing a portion of the reinsurance requested, uses the bid preparation page 130 to prepare and submit its bid. The system server 15 provides in appropriate spaces on the bid preparation screen known information relating to the request for reinsurance, including the client name, the participating reinsurers name and the previously specified terms of the reinsurance sought. In particular, the bidding reinsurer's name 132 and the client's name 133 are provided. The reinsurance terms 135 as listed on the prospectus page 83 and reinsurance request submission screen 30, are listed in a similar fashion on the bid preparation page 130.

The bid preparation page 130 includes a bid preparation section 138 for completion by a representative of the bidding reinsurer. The representative is often referred to as an underwriter. The representative provides his or her name in the name space 140. A bid status box 141 is provided, and the system server 15 automatically provides an indication of the status of the bid, as open for bidding ("open"), already bid upon by the reinsurer ("quoted"), or the period for bidding has closed ("closed").

The reinsurer through its representative, then confirms that it accepts the non-price terms by clicking on or selecting a check or radio button box 143. The reinsurer then indicates the percent of coverage it is willing to offer, expressed as a minimum share using minimum share selection box 145, and a maximum share using maximum share selection box 146. The reinsurer also specifies the price or rate at which it is willing to offer the coverage using the price/rate selection box 147. As used herein, the terms rate and price are considered synonymous. The reinsurer may add any special conditions for providing coverage in the special conditions text entry box 151. The reinsurer then provides authorization for the sponsor to release the bid to the client by selecting or clicking on check or radio button box 152. In addition, the reinsurer provides an expiration date for its offer or proposal in the expiration date selection box 153.

The bid may include additional information not shown in FIG. 5. For example, in excess type coverage, the system may be programmed to allow the bidding reinsurer to bid on a specific line or layer of the reinsurance. Other aspects of a bid may also be included in the bid preparation page 130.

Once the reinsurer has completed and is prepared to submit the bid, it selects or clicks on the submit bid button 155. The system server 15 is programmed to verify that the reinsurer has provided all of the required information for the bid to be valid. If necessary information is missing, the system 15 will provide notice to the reinsurer indicating that the bid has not been accepted, the reason why it was not accepted and an indication that the bid may be corrected and resubmitted.

Because the auction sponsor collects the necessary underwriting information, and performs an underwriting analysis of the insurance program for which reinsurance is sought, the participating reinsurers do not have to duplicate the underwriting analysis. The auction therefore provides savings to the participating reinsurers which can be passed on to the client through better offers on the rate or price of reinsurance. The agreement entered into between the sponsor and participating reinsurers contractually prohibits the participating reinsurer from bidding on the request for reinsurance outside of the auction system, once the reinsurer has accessed the prospectus page 83. This prohibition is intended to prevent the reinsurers from gaining the benefit from the sponsors underwriting analysis without participating in the auction.

Once the bid period ends, the sponsor accesses or views the bids to determine which bids to accept and in what manner. Prior to determining which bids to accept, the sponsor evaluates the bids for compliance with auction rules and capacity limitations and makes adjustments to the bids to incorporate administrative fees and expenses. There are generally three types of administrative fees which are incorporated into each bid by the sponsor: a credit default charge or credit risk fee, an expense charge and a broker fee.

The credit risk fee is a form of self insurance by the sponsor to cover any losses associated with guarantees of payment of claims by the reinsurers. In some cases, the sponsor may guarantee payment by the participating reinsurers of any proper claims submitted by the client. Charging a credit risk fee is a tool to recapture potential losses due to a default by a participating reinsurer in paying a claim. The fee charged is typically based upon a percentage of the total bid.

The expense charge is intended to cover the sponsors expenses associated with underwriting the deal, holding the auction and processing and servicing the client or client program, including handling of claims. The fee charged is based upon cost accounting and is charged as a percentage of the total bid. If a broker is involved, a customary brokerage charge is added to all bids. The brokerage fee is normally charged as a percentage of the total bid. It is to be understood that the fees may be charged as flat fees, sliding scales or other methods known in the art.

Once the sponsor has made the necessary adjustments to the bids, the sponsor optimizes the bids to prepare a proposal for presentation to the client including the bids selected to provide the requested reinsurance at the best price. The optimization process generally involves maximizing the amount of reinsurance coverage provided by the lowest bidders, while limiting the amount of coverage offered by any one reinsurer to its maximum share bid, its specific capacity as set by the sponsor or the capacity set by the sponsor for any one reinsurer to bid. In addition to optimizing the bids, the sponsor posts all of the bids on the system server 15 and provides access to the bid information through a bid proposal presentation screen 160 as generally shown in FIG. 6.

Figure 6:
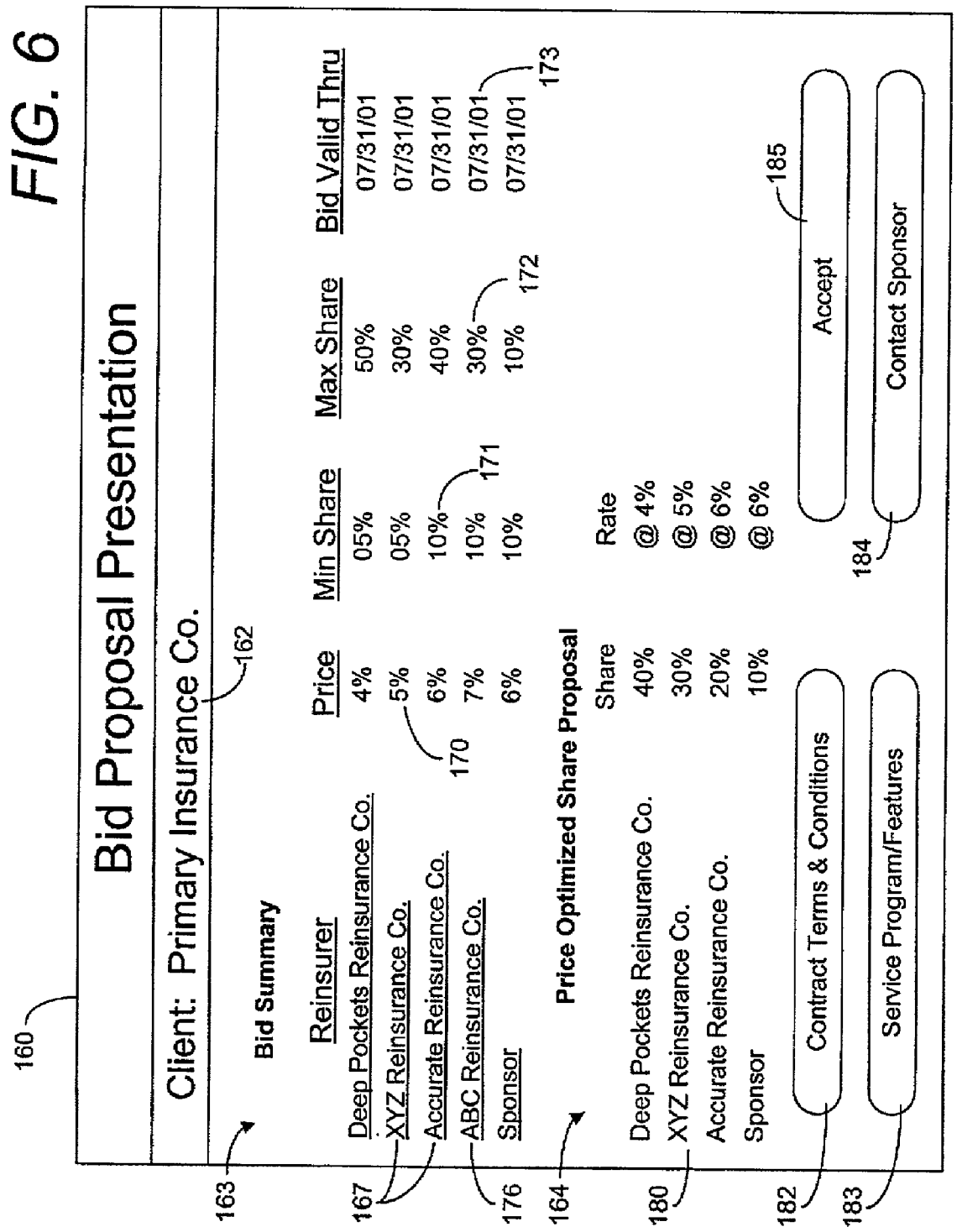
FIG. 6 is a diagrammatic view of a bid proposal presentation web page including a listing of bids submitted and a proposal of bids accepted for providing reinsurance in response to the request.

Referring to FIG. 6, the system server 15 includes the name of the client in a client name space 162. The bid proposal presentation screen 160 also includes a Bid Summary section 163 and a Price Optimized Share Proposal section 164. The bid summary includes a listing 167 for each bidding reinsurer of critical terms for the bid under the appropriate headings including: price 170, minimum share 171, maximum share 172 and a date through which the bid is valid 173. The listing 167 for each bid may include additional information as necessary. For example, if the bids are by line or layer the listing probably would include information on the line or layer upon which the reinsurance company is bidding or seeking to provide coverage. The name of each reinsurer provided in the listing 167 may also function as a hypertext link 176 to provide access to pages providing additional information regarding the bid of that party.

The listing 167 shown in FIG. 6 includes bid information for the sponsor. As noted previously, the sponsor may agree in advance to participate in the reinsurance to instill confidence in the program or package. Although the sponsor's bid is shown as 10 percent in FIG. 6, it is to be understood that the sponsor's participation could vary widely and could be the largest percentage of the total reinsurance offered.

The Price Optimized Share Proposal section 164 provides an optimized listing of the reinsurance proposals which were accepted, including the share amount and the price. In the example shown, it is assumed that the sponsor sets a maximum capacity of any one bidding reinsurance company at 40 percent of any transaction. In addition, the specific capacities of the participating reinsurers are 50% for Deep Pockets Reinsurance Co. and 40% for all of the remaining reinsurers. As noted above, the sponsor has set forth in advance that it will cover 10 percent of the reinsurance offered. The sponsor preferably sets its bid price prior to accepting bids from the other reinsurers but does not disclose its bid price until it releases the bid proposal such as shown in FIG. 6. The example also assumes that none of the reinsurers are close to using up their total capacity to cover the proposed reinsurance.

The sponsor's bid of 10% is automatically included in the proposal. Although Deep Pockets is the lowest bidder, since the capacity of any one participant is 40%, Deep Pocket's portion of the total bid has been set at 40%. Since XYZ has a maximum capacity of 40% and its maximum bid was only 30%, the proposal will include 30% coverage from XYZ. The remaining 20% of reinsurance coverage will be provided by Accurate Reinsurance which had the next lowest share price and has sufficient capacity to supply the remaining 20% of reinsurance coverage. The proposed coverage to be provided by the selected reinsurers is then provided as a listing 180 of the selected participants under the heading for Price Optimized Share Proposal 164. The bid proposal presentation screen 160 is generally accessible by clients through the website, once the bidding is over. Alternatively, the information provided in the presentation screen 160 may be provided in paper form or other electronic formats.

At the bottom of the screen a terms and conditions button 182 is provided to allow the client to review the other terms of the reinsurance contract. A service Program/Features button 183 is provided to allow the client to advance to pages which will provide additional information regarding the services to be offered in association with the resulting reinsurance agreement. A communications link 184 is provided to allow the user to contact the sponsor with any questions concerning the proposal. For example, it is foreseen that the client may want a final say as to what reinsurers to accept through the bid process. The client may decide that it wants to include as one of its reinsurers a reinsurer who was not included in the price optimized proposal because it was not a low bidder. In addition, the client may want the sponsor to adjust the bids of the bidding reinsurers, which is permissible, as long as the changes do not result in a reinsurer exceeding its capacity or bid limits or capacities established by the sponsor. Finally if the client decides to accept the proposal, the client selects the Accept button 185.

The agreement with the reinsurers may provide that once the client accepts the bid proposal, the selected reinsurers are bound to provide the reinsurance offered.

Alternatively, once the client accepts the bid proposal, the sponsor notifies the bidding reinsurers of the selection auction and selection results and contractually binds the selected reinsurers to provide the reinsurance offered.

Once the proposal is accepted and the selected reinsurers bound, the sponsor bills and collects premiums from the client on behalf of all of the selected reinsurers. The reinsurer then remits the appropriate percentage of the premium to the participating reinsurers. The sponsor also manages any claims submitted by the client for coverage under the reinsurance program and the accounting associated with payment of claims by the selected reinsurers. The sponsor also manages customer service functions on behalf of the selected reinsurers. Such functions include questions regarding the reinsurance program from the client, auditing functions, reporting requirements, and risk management consulting.

It is to be understood that the process described could be utilized to auction primary insurance coverage as well as reinsurance. It is also foreseen that the auction process described above could be used by selected reinsurers or primary insurers to reauction, trade or sell its obligations or portion of the reinsurance or insurance program. The selected reinsurer may do so to restructure its risk exposure or capacity, such as to focus on different lines of coverage. Similarly, it is foreseen that the auction process could be utilized to auction obligations on existing claims. An insurer with greater expertise in handling certain types of claims might be interested in purchasing another insurer's existing claims on the belief that it could resolve the claims more efficiently and for less money.

Figure 7:
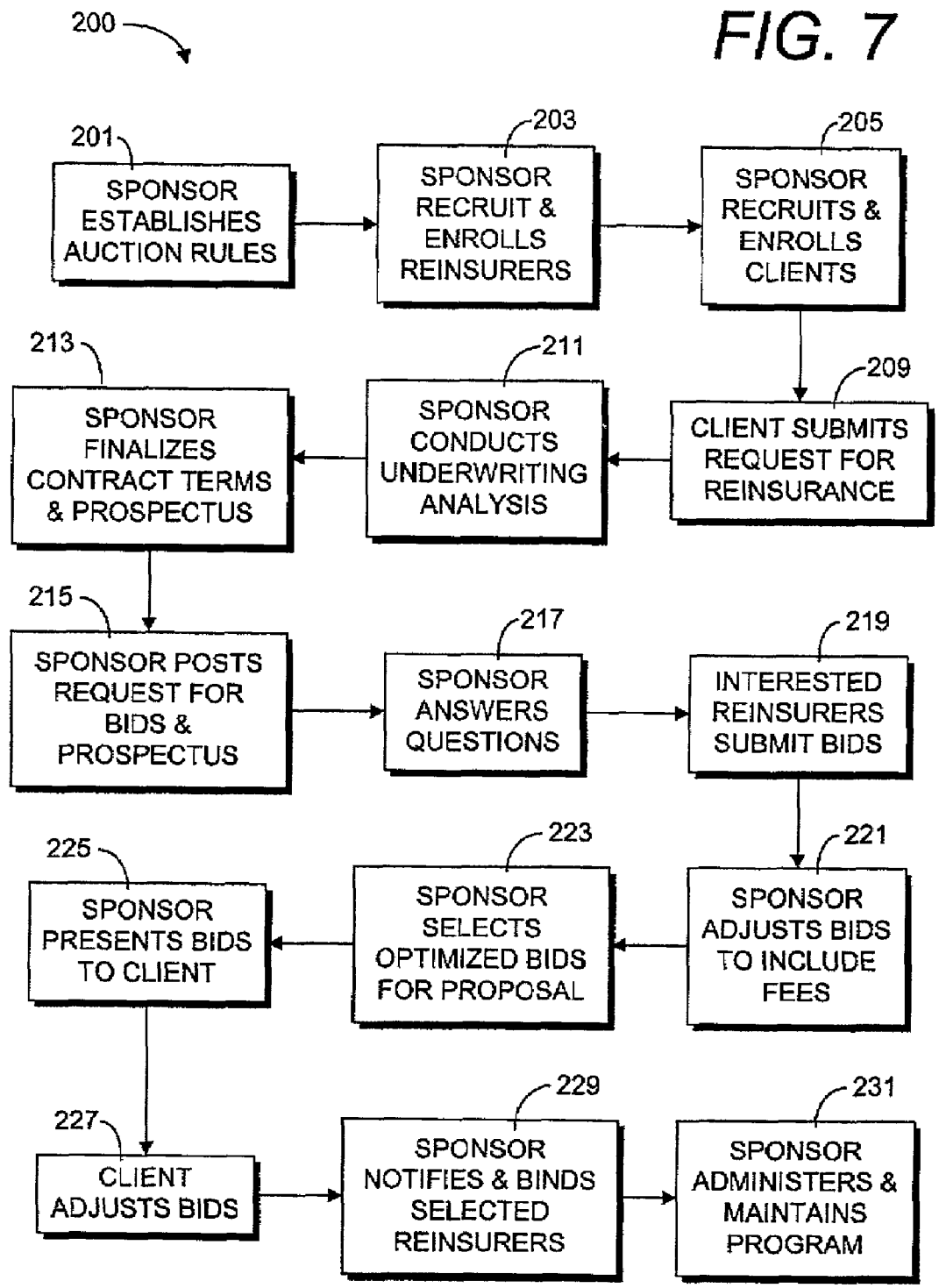
FIG. 7 is a flow diagram illustrating principal steps in the reinsurance auction process.

Having described the reinsurance auction process in detail with reference to interactive web pages which represent one approach for implementing the system, reference is made to FIG. 7 which provides a process flow diagram outlining the basic steps of the reinsurance auction process 200 as described in more detail above. A preliminary step of the process involves establishing auction rules, eligibility requirements for clients and reinsurers, risk management tools and contracts between the parties. This step or steps may generally be referred to as the step 201 of establishing auction rules. Another preliminary step 203 involves recruiting and enrolling reinsurers to participate in the auction process. At about the same time, or thereafter, the sponsor recruits and enrolls clients at step 205.

As noted previously, the preliminary steps do not necessary occur in the order listed and may overlap. In addition, the process steps 203 and 205 of recruiting and enrolling reinsurers and clients is generally a continuous process. Similarly, the auction rules will be continually updated such as to accommodate changes in the marketplace or regulations.

The actual auction process is generally initiated by a client submitting a request for reinsurance at step 209. The request may be formulated as noted above with reference to the request submission screen 30. Once the request is submitted, the sponsor performs an underwriting analysis of the request at step 211. The sponsor then finalizes the contract terms with the client and prepares a prospectus for the request for reinsurance at step 213.

Upon completion of the prospectus, the sponsor posts a request for bids for providing the reinsurance requested, along with a copy of the prospectus at step 215. In posting the request for bids the sponsor also establishes a period for questions and answers regarding the bid and a period in which it will accept bids. The prospectus may be posted on the auction website as generally shown in FIG. 4. The sponsor then answers, at step 217, any questions submitted during the question and answer period. During the bid period, interested reinsurers submit, and the sponsor accepts, bids at step 219. Bid submissions may be made in a manner as noted above using the bid preparation screen 130.

Once the bidding period ends, the sponsor reviews and adjusts the bids to account for administrative expenses, credit risk charges and the like which is shown at step 221. The sponsor then optimizes the bids to prepare a proposal which minimizes the cost of reinsurance at step 223. The sponsor presents the bids and proposal to the client at step 225, such as through bid proposal presentation screen 160. The sponsor then allows the client, at step 227, to adjust the percentage participation of the reinsurers, as long as the changes do not violate the auction rules, including exceeding established capacities. After any adjustments by the client, the sponsor notifies the bidding reinsurers of the results of the auction and binds the selected reinsurers at step 229. Finally, the sponsor administers and maintains the reinsurance program at step 231.

It is to be understood that while certain forms of the present invention have been illustrated and described herein, it is not to be limited to the specific forms or arrangement of parts described and shown. For example, the pages shown are generally simplified versions of the pages as they will actually appear. The pages may include buttons or the like to allow the user to suspend or short circuit the process at any point to attend to other matters or obtain additional information. The pages also may include links to additional resource information such as the identification of representatives of the sponsor which have responsibility for the client's account and links to related or informational websites. Additional functionality may also be designed into the pages to facilitate use of the system.

What is claimed is:

1. A method of coordinating, by a sponsor, an auction for providing reinsurance for an insurance program of a cedent by a plurality of reinsurers using a server system coupled to a database and at least one client system, the server system and the database are associated with the sponsor, the method comprising the steps of:

establishing a network of participating reinsurers meeting eligibility requirements to participate in said auction;

establishing a reinsurance capacity for each of said participating reinsurers;

displaying a submission screen on the at least one client system for prompting a cedent to input a request for reinsurance of an insurance program, the submission screen is stored within the database and is transmitted to the at least one client system, the submission screen including a first section for prompting the cedent to input basic parameters of the request for reinsurance, and a second section for prompting the cedent to respond to questions and attach documents for underwriting the insurance program associated with the request;

receiving at the server said request for reinsurance of the insurance program from the cedent;

performing by the sponsor an underwriting analysis of said request for reinsurance and producing by the sponsor an underwriting report including an analysis of risk of loss associated with said insurance program, wherein the risk of loss analysis includes an amount of losses expected on said insurance program over a predetermined period of time, wherein the underwriting analysis includes the sponsor determining a single underwriting standard for analyzing said request for reinsurance and producing the underwriting report;

making said request for reinsurance and said underwriting report available to said participating reinsurers and enabling said participating reinsurers to make respective bids, during a selected period, to reinsure a portion of said insurance program;

submitting bids using the at least one client system by each of the participating reinsurers after said request for reinsurance and said underwriting report have been made available to the participating reinsurers, each bid to include a maximum percentage of reinsurance for said insurance program offered by said participating reinsurer and a rate specified by said participating reinsurer;

receiving said bids at the server from said participating reinsurers during said selection period;

selecting said bids by the sponsor which fulfill said request for reinsurance, as a reinsurance proposal; and offering said reinsurance proposal to said cedent.

2. The method as in claim 1 wherein said step of selecting bids for said reinsurance proposal comprises optimizing the bids selected to minimize the cost of said reinsurance proposal to said cedent.

3. The method as in claim 1 further comprising the step of notifying said participating reinsurers that said sponsor will provide a portion of said reinsurance at a price and percentage to be determined by said sponsor prior to selecting bids for said reinsurance proposal.

4. The method as in claim 1 further comprising the steps of:
binding, by said sponsor, said selected participating reinsurers to provide reinsurance for said insurance program; and
guaranteeing, by said sponsor, payment by each of said selected participating reinsurers for any proper claims made for reinsurance of said insurance program.

5. The method as in claim 4 further comprising the step of adjusting said rate of each bid to include a credit risk charge; said sponsor collecting said credit risk charge to insure against the risk of default by participating reinsurers on payments for proper claims guaranteed by said sponsor.

6. The method as in claim 1 further comprising the step of adjusting said rate of each bid to include a service charge to be paid by said cedent and collected by said sponsor.

7. The method as in claim 1 further comprising the steps of:
binding said selected participating reinsurers to provide reinsurance for said insurance program;
collecting premiums from said cedent for said reinsurance and distributing to each of said selected participating reinsurers its share of the premiums collected; and
processing claims made against said reinsurance, including notifying each said selected participating reinsurers of claims due under said reinsurance, collecting claims payments from each of said selected participating reinsurers, and distributing said claims payments to said cedent.

8. The method as in claim 1 and further comprising, after said step of selecting bids for said reinsurance proposal, the step of allowing said cedent to adjust a percentage of participation of selected and non-selected participating reinsurers within each participating reinsurer's capacity.

9. The method as in claim 1 wherein said reinsurance comprises an agreement to pay claims obligations under an existing insurance program.

10. The method as in claim 1 further comprising the step of determining whether said request for reinsurance meets minimum eligibility requirements for submission of said request to said network of participating reinsurers.

11. A method of coordinating, by a sponsor, an auction for providing insurance for a cedent by a plurality of insurers, comprising the steps of:
providing a server system associated with the sponsor, the server system coupled to a database;
providing a plurality of client systems associated with the cedent and the plurality of insurers, the client systems coupled to the server;
establishing a network of participating insurers meeting eligibility requirements to participate in said auction;
establishing an insurance capacity for each of said participating insurers; displaying a submission screen on the at least one client system for prompting a cedent to input a request for insurance, the submission screen is stored within the database and is transmitted to the at least one client system, the submission screen including a first section for prompting the cedent to input basic parameters of the request for insurance, and a second section for prompting the cedent to respond to questions and attach documents for underwriting the insurance associated with the request;
receiving at the server said request for insurance from the cedent;
performing by the sponsor an underwriting analysis of said request for insurance and producing by the sponsor an underwriting report including an analysis of risk of loss associated with said insurance, wherein the risk of loss analysis includes an amount of losses expected on said insurance over a predetermined period of time, wherein the underwriting analysis includes the sponsor determining a single underwriting standard for analyzing said request for insurance and producing the underwriting report;
making said request for insurance and said underwriting report available to said participating insurers and enabling said participating insurers to make respective bids, during a selected period, to cover a portion of said insurance, each bid to include a maximum percentage of insurance offered by said participating insurer and a rate specified by said participating insurer;
submitting said bids using the at least one client system by each of the participating insurers after said request for insurance and said underwriting report have been made available to the participating insurers;

receiving said bids at the server from said participating insurers during said selected period;

selecting said bids by the sponsor which fulfill said request for insurance, as an insurance proposal; and offering said insurance proposal to said cedent.

12. The method as in claim 11 wherein said step of selecting bids for said insurance proposal comprises optimizing the bids selected to minimize the cost of said insurance proposal to said cedent.

13. The method as in claim 11 further comprising the step of notifying said participating insurers that said sponsor will provide a portion of said insurance at a rate and percentage to be determined by said sponsor prior to selecting bids for said insurance proposal.

14. The method as in claim 11 further comprising the steps of:

binding, by said sponsor, said selected participating insurers to provide said insurance; and guaranteeing, by said sponsor, payment by each of said selected participating insurers for any proper claims made on said insurance.

15. The method as in claim 14 further comprising the step of adjusting said rate of each bid to include a credit risk charge; said sponsor collecting said credit risk charge to insure against the risk of defaults by participating insurers on payments for proper claims guaranteed by said sponsor.

16. The method as in claim 11 further comprising the step of adjusting said rate of each bid to include a service charge to be paid by said cedent and collected by said sponsor.

17. The method as in claim 11 further comprising the steps of:

binding said selected participating insurers to provide a portion of said insurance;

collecting premiums from said cedent for said insurance and distributing to each of said selected participating insurers its share of the premiums collected; and processing claims made against said insurance, including notifying each said selected participating insurer of claims due under said insurance, collecting claims payments from each of said selected participating insurer, and distributing said claims payments to said cedent.

18. The method as in claim 11, and further comprising, after said step of selecting bids for said insurance proposal, the step of allowing said cedent to adjust a percentage of participation of selected and non-selected participating insurers within each participating insurers capacity.

19. The method as in claim 11 wherein said insurance comprises an agreement to pay claims obligations under an existing insurance agreement.

20. The method as in claim 11 further comprising the step of determining whether said request for insurance meets minimum eligibility requirements for submission of said request to said network of participating insurers.

21. A process for coordinating, by a sponsor, an auction for providing insurance for a cedent by a plurality of insurers, the process using a computer associated with the sponsor coupled to a remote computer, said process comprising the steps of:

establishing a network of participating insurers meeting eligibility requirements to participate in said auction;

establishing an insurance capacity for each of said participating insurers;

displaying a submission screen on the remote computer for prompting a cedent to input a request for insurance, the submission screen is stored at the sponsor computer and is transmitted to the remote computer, the submission screen including a first section for prompting the cedent to input basic parameters of the request for insurance, and a second section for prompting the cedent to respond to questions and attach documents for underwriting the insurance associated with the request;

receiving at the sponsor computer said request for insurance from the cedent;

performing an underwriting analysis of said request for insurance by the sponsor, wherein the underwriting analysis includes the sponsor determining a single underwriting standard for analyzing said request for insurance;

producing an underwriting report including an analysis of risk of loss associated with said insurance program, wherein the risk of loss analysis includes an amount of losses expected on the insurance program over a predetermined period of time;

making said request for insurance and said underwriting report available to said participating insurers and enabling said participating insurers to make respective bids, during a selected period, to cover a portion of said insurance, each bid to include a maximum percentage of insurance offered by said participating insurer and a rate specified by said participating insurer;

submitting said bids using the remote computer by each of the participating insurers after said request for insurance and said underwriting report have been made available to the participating insurers;

receiving said bids from said participating insurers during said selection period;

selecting said bids which fulfill said request for insurance, as an insurance proposal;

offering said insurance proposal to said cedent;

binding said selected participating insurers to provide said insurance; and guaranteeing, by said sponsor, payment by each of said selected participating insurers for any proper claims made on said insurance.

22. The method as in claim 21 further comprising the step of adjusting said rate of each bid to include a credit risk charge; said sponsor collecting said credit risk charge to insure against the risk of defaults by participating insure s on payments for proper claims guaranteed by said sponsor.

23. The method as in claim 21 further comprising the step of adjusting said rate of each bid to include a service charge to be paid by said cedent and collected by said sponsor.

24. The method as in claim 21 further comprising the steps of:

binding said selected participating insurers to provide a portion of said insurance;

collecting premiums from said cedent for said insurance and distributing to each of said selected participating insurers its share of the premiums collected; and processing claims made against said insurance, including notifying each of said selected participating insurers of claims due under the insurance, collecting claims payments from each of said selected participating insurers, and distributing said claims payments to said cedent.

25. The method as in claim 21, and further comprising, after said step of selecting bids for said insurance proposal, the step of allowing said cedent to adjust a percentage of participation of selected and non-selected participating insurers within each participating insurers capacity.

26. The method as in claim 21 wherein said step of selecting bids for said insurance proposal comprises optimizing the bids selected to minimize the cost of said insurance proposal to said cedent.

27. The method as in claim 21 further comprising the step of notifying said participating insurers that said sponsor will provide a portion of said insurance at a rate and percentage to be determined by said sponsor prior to selecting bids for said insurance proposal.

28. The method as in claim 21 wherein said insurance comprises an agreement to pay claims obligations under an existing insurance agreement.

29. A process for coordinating, by a sponsor, an auction for providing reinsurance for a cedent by a plurality of insurers, the process using a computer associated with the sponsor coupled to a plurality of remote computers, said process comprising the steps of:

establishing a network of participating reinsurers meeting eligibility requirements to participate in said auction;

establishing a reinsurance capacity for each of said participating reinsurers;

displaying a submission screen on at least one of the remote computers for prompting a cedent to input a request for reinsurance, the submission screen is stored at the sponsor computer and is transmitted to the remote computer, the submission screen including a first section for prompting the cedent to input basic parameters of the request for reinsurance, and a second section for prompting the cedent to respond to questions and attach documents for underwriting the reinsurance associated with the request;

receiving at the sponsor computer said request for reinsurance from the cedent;

performing an underwriting analysis of said request for reinsurance by the sponsor wherein the underwriting analysis includes the sponsor determining a single underwriting standard for analyzing said request for reinsurance and producing the underwriting report;

producing, by the sponsor, an underwriting report including an analysis of risk of loss associated with said reinsurance program, wherein the risk of loss analysis includes an amount of losses expected on said reinsurance program over a predetermined period of time;

making said request for reinsurance and said underwriting report available to said participating reinsurers and enabling said participating reinsurers to make respective bids, during a selected period, to cover a portion of said reinsurance;

submitting bids using at least one of the remote computers by each of the participating reinsurers after said request for reinsurance and said underwriting report have been made available to the participating reinsurers, each bid to include a maximum percentage of reinsurance offered by said participating reinsurer and a rate specified by said participating reinsurer;

receiving said bids from said participating reinsurers during said selected period;

selecting said bids which fulfill said request for reinsurance, as a reinsurance proposal;

offering said reinsurance proposal to said cedent;

binding said selected participating reinsurers to provide said reinsurance; and guaranteeing, by said sponsor, payment by each of said selected participating reinsurers for any proper claims made on said reinsurance.

30. The method as in claim 29 further comprising the step of adjusting said rate of each bid to include a credit risk charge; said sponsor collecting said credit risk charge to insure against the risk of defaults by participating reinsurers on payments for proper claims guaranteed by said sponsor.

31. The method as in claim 29 further comprising the step of adjusting said rate of each bid to include a service charge to be paid by said cedent and collected by said sponsor.

32. The method as in claim 29 further comprising the steps of:

binding said selected participating reinsurers to provide a portion of said reinsurance;

collecting premiums from said cedent for said reinsurance and distributing to each of said selected participating reinsurers its share of the premiums collected; and processing claims made against said reinsurance, including notifying each said selected participating reinsurers of claims due under the reinsurance, collecting claims payments from each of said selected participating reinsurers, and distributing said claims payments to said cedent.

33. The method as in claim 29 and further comprising, after said step of selecting bids for said reinsurance proposal, the step of allowing said cedent to adjust a percentage of participation of selected and non-selected participating reinsurers within each participating reinsurers capacity.

34. The method as in claim 29 wherein said step of selecting bids for said reinsurance proposal comprises optimizing the bids selected to minimize the cost of said reinsurance proposal to said cedent.

35. The method as in claim 29 further comprising the step of notifying said participating reinsurers that said sponsor will provide a portion of said reinsurance at a rate and percentage to be determined by said sponsor prior to selecting bids for said reinsurance proposal.

36. The method as in claim 29 wherein said reinsurance comprises an agreement to pay claims obligations under an existing reinsurance agreement.

* * * * *